(12) United States Patent
Davis et al.

(10) Patent No.: US 10,167,957 B2
(45) Date of Patent: Jan. 1, 2019

(54) 2 PLY W-SEAL USING DISSIMILAR MATERIALS

(71) Applicant: UNITED TECHNOLOGIES CORPORATION, Farmington, CT (US)

(72) Inventors: Timothy M. Davis, Kennebunk, ME (US); Terence P. Tyler, Jr., East Waterboro, ME (US); Jose R. Paulino, Saco, ME (US); Paul M. Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 415 days.

(21) Appl. No.: 15/169,197

(22) Filed: May 31, 2016

(65) Prior Publication Data
US 2017/0343112 A1 Nov. 30, 2017

(51) Int. Cl.
| | | |
|---|---|---|
| F01D 11/00 | (2006.01) |
| F16J 15/52 | (2006.01) |
| C22C 19/05 | (2006.01) |
| C22C 30/00 | (2006.01) |
| F01D 11/08 | (2006.01) |
| C22C 19/07 | (2006.01) |
| F16J 15/08 | (2006.01) |

(52) U.S. Cl.
CPC .......... *F16J 15/52* (2013.01); *C22C 19/056* (2013.01); *C22C 19/07* (2013.01); *C22C 30/00* (2013.01); *F01D 11/005* (2013.01); *F01D 11/08* (2013.01); *F16J 15/0887* (2013.01); *F05D 2240/55* (2013.01); *F05D 2250/75* (2013.01); *F05D 2300/175* (2013.01)

(58) Field of Classification Search
CPC .. F01D 1/005; F05D 2240/55; F05D 2250/75; F16J 15/022; F16J 15/028
See application file for complete search history.

(56) References Cited

U.S. PATENT DOCUMENTS

| | | | |
|---|---|---|---|
| 3,595,588 A * | 7/1971 | Rode | F16J 15/0887 |
| | | | 277/647 |
| 4,759,555 A | 7/1988 | Halling | |
| 4,917,391 A | 4/1990 | Shelinbarger, Jr. et al. | |
| 5,433,370 A * | 7/1995 | Halling | F16J 15/0887 |
| | | | 228/155 |
| 5,716,052 A * | 2/1998 | Swensen | F16J 15/0887 |
| | | | 277/608 |

(Continued)

FOREIGN PATENT DOCUMENTS

| | | |
|---|---|---|
| EP | 1 177 367 | 2/2002 |
| EP | 1306589 | 5/2003 |

OTHER PUBLICATIONS

Waspaloy, Special Metals, 2004, http://www.specialmetals.com/assets/smc/documents/alloys/other/waspaloy.pdf (Year: 2004).*

(Continued)

*Primary Examiner* — Ninh H. Nguyen (57) ABSTRACT

A metal gasket bellows seal includes a first ply comprised of a first material having a first yield strength. The metal gasket bellows seal also includes a second ply positioned adjacent to the first ply and comprised of a second material having a second yield strength that is less than the first yield strength.

18 Claims, 5 Drawing Sheets

(56) References Cited

U.S. PATENT DOCUMENTS

| | | | |
|---|---|---|---|
| 6,227,546 B1 | 5/2001 | Halling | |
| 6,237,921 B1 | 5/2001 | Liotta et al. | |
| 6,968,615 B1* | 11/2005 | More | F16J 15/0887 |
| | | | 277/654 |
| 7,121,790 B2 | 10/2006 | Fokine et al. | |
| 7,451,989 B1* | 11/2008 | Cornett | F16J 15/0806 |
| | | | 277/626 |
| 8,714,565 B1 | 5/2014 | Cornett | |
| 9,850,773 B2* | 12/2017 | Zelesky | F16J 15/0887 |
| 2015/0076770 A1 | 3/2015 | Parker | |
| 2016/0084099 A1 | 3/2016 | Davis | |

OTHER PUBLICATIONS

Haynes 188 alloy, Haynes International, 2015, http://www.haynesintl.com/alloys/alloy-portfolio_/High-temperature-Alloys/HAYNES188alloy.aspx (Year: 2015).*
EP Search Report dated Oct. 27, 2017 in EP Application No. 17173387.6.

* cited by examiner

2 PLY W-SEAL USING DISSIMILAR MATERIALS

FIELD

The present disclosure is directed to a gasket seal and, more particularly, for a seal for use in a turbine or compressor section of a gas turbine engine.

BACKGROUND

Gas turbine engines, such as those that power modern commercial and military aircraft, may include a fan section to propel the aircraft, a compressor section to pressurize a supply of air from the fan section, a combustor section to burn fuel in the presence of the pressurized air, and a turbine section to extract energy from the resultant combustion gases and to generate thrust.

The compressor section and turbine section each have multiple stages of rotors that rotate about a central axis and multiple stages of stators that are stationary relative to the central axis. It is desirable to reduce fluid leakage between the stages of rotors and stators. Bellows seals, or "W seals," are frequently used to reduce fluid leakage between the stages of rotors and stators.

Bellows seals may be used in portions of the gas turbine engine that experience relatively high temperatures and it is therefore desirable for the bellows seals to have a relatively high temperature capability. Furthermore, because the bellows seals are used between components that may move relative to each other, it is desirable for the bellows seals to have relatively high yield strength. Additionally, because the components surrounding the bellows seal may move relative to the bellows seal during operation, it is desirable for the bellows seal to have relatively high wear resistance.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Disclosed herein is a metal gasket bellows seal. The metal gasket bellows seal includes a first ply comprised of a first material having a first yield strength. The metal gasket bellows seal also includes a second ply positioned adjacent to the first ply and comprised of a second material having a second yield strength that is different than the first yield strength.

In any of the foregoing metal gasket bellows seals, the second material has a greater maximum operating temperature than the first material.

In any of the foregoing metal gasket bellows seals, the second material has a greater wear resistance than the first material.

In any of the foregoing metal gasket bellows seals, the first material includes a nickel-based alloy.

In any of the foregoing metal gasket bellows seals, the first material includes an alloy having, by weight percent (wt %), 58% nickel, 19% chromium, 13% cobalt, 4% molybdenum, 3% titanium and 1.4% aluminum.

In any of the foregoing metal gasket bellows seals, the second material includes a cobalt based alloy or a nickel based alloy.

In any of the foregoing metal gasket bellows seals, the second material includes an alloy having, by weight percent (wt %), 39% cobalt, 22% nickel, 22% chromium and 14% tungsten.

In any of the foregoing metal gasket bellows seals, the first yield strength is between 40 kilopounds per square inch (KSI) and 90 KSI at a temperature of 787.8 degrees Celsius and the second yield strength is between 20 KSI and 50 KSI at the temperature of 787.8 degrees Celsius.

In any of the foregoing metal gasket bellows seals, the metal gasket bellows seal has a first end, a second end and a serpentine shape and wherein the first ply and the second ply define a first dimple proximate to the first end and a second dimple proximate to the second end.

In any of the foregoing metal gasket bellows seals, the second material has a second yield strength that is less than the first yield strength.

Any of the foregoing metal gasket bellows seals may also include at least one spacer positioned between the first ply and the second ply and configured to reduce a surface area of contact between the first ply and the second ply.

In any of the foregoing metal gasket bellows seals, the at least one spacer has an annular shape extending substantially along a circumference of the metal gasket bellows seal.

In any of the foregoing metal gasket bellows seals, the at least one spacer includes multiple spacers each extending for a portion of a circumference of the metal gasket bellows seal.

In any of the foregoing metal gasket bellows seals, the at least one spacer is comprised of a third material that includes at least one of a metal or a ceramic.

In any of the foregoing metal gasket bellows seals, the third material is the same as the second material.

In any of the foregoing metal gasket bellows seals, the first ply and the second ply each have a thickness between 1 thousandth of an inch (1 mil, 0.0254 millimeters (mm)) and 10 mils (0.254 mm).

Also disclosed is a metal gasket bellows seal. The metal gasket bellows seal includes a first ply comprised of a first material having a first yield strength, the first ply having a first inner surface. The metal gasket bellows seal also includes a second ply positioned adjacent to the first ply and comprised of a second material having a second yield strength that is less than the first yield strength, the second ply having a second inner surface. The metal gasket bellows seal also includes at least one spacer positioned between the first ply and the second ply and in contact with the first inner surface and the second inner surface.

In any of the foregoing metal gasket bellows seals, the at least one spacer includes multiple spacers each in contact with a portion of the first inner surface and the second inner surface.

Also described is a turbine section of a gas turbine engine. The turbine section includes a blade outer air seal and a vane. The turbine section also includes a metal gasket bellows seal positioned between the blade outer air seal and the vane and having a first ply comprised of a first material having a first yield strength and a second ply positioned adjacent to the first ply and comprised of a second material having a second yield strength that is less than the first yield strength.

In any of the foregoing turbine sections, the second material has a greater maximum operating temperature than the first material and the second material has a greater wear resistance than the first material.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. An A-R-C axis is shown throughout the drawings to illustrate the axial, radial and circumferential directions.

Figure 1:
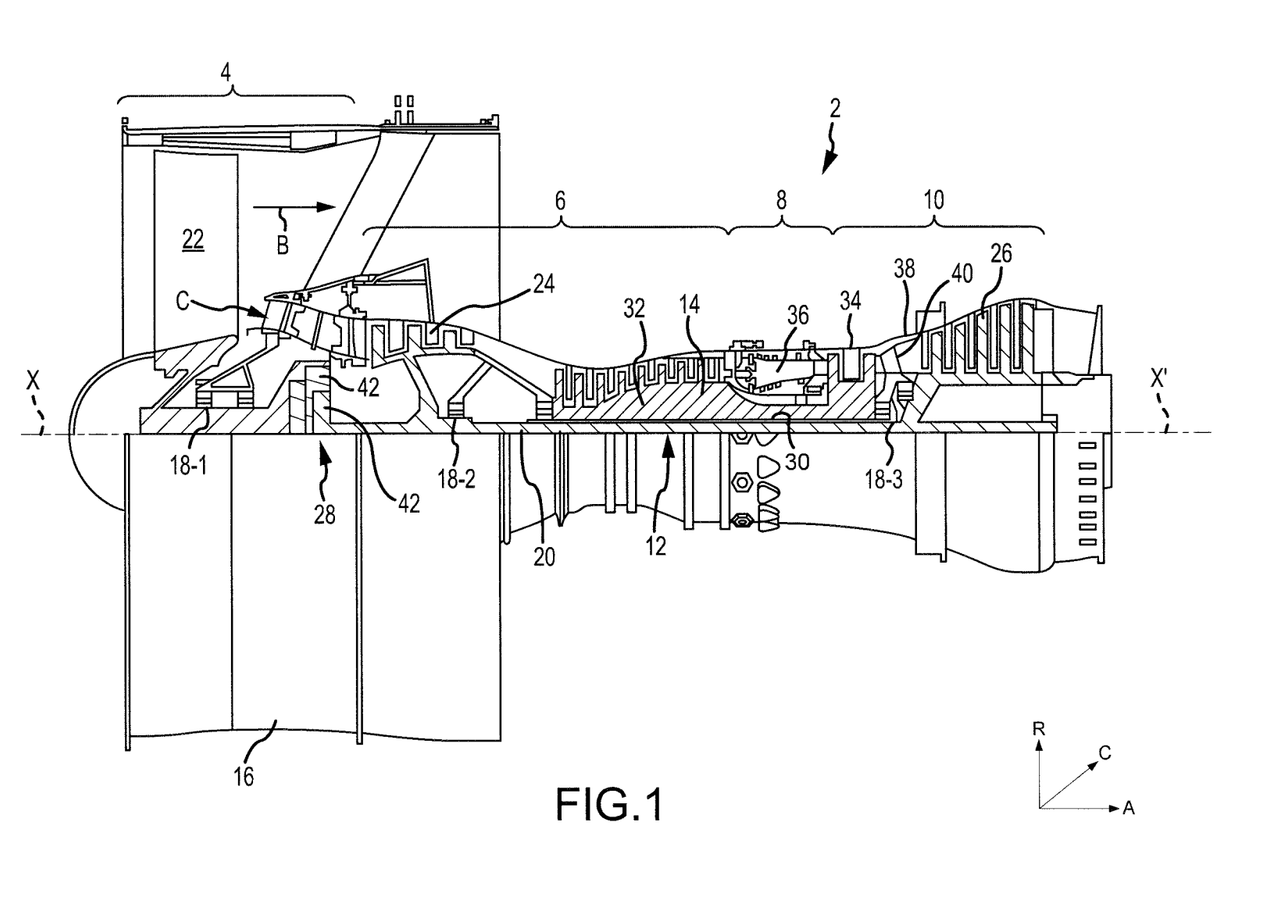
FIG. 1 is a schematic cross-section of a gas turbine engine, in accordance with various embodiments.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path b while compressor section 6 can drive air along a core flow-path c for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbine sections 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly greater than that of the low pressure compressor section 24, and the low pressure turbine section 26 may have a pressure ratio that is greater than about 5:1. The pressure ratio of low pressure turbine section 26 may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400 degrees Fahrenheit (1400° F., approximately 760° C.) or more, and operating conditions in combustor 36 may be significantly higher.

In various embodiments, combustor section 8 may comprise one or more combustor 36. As mentioned, the core airflow c may be compressed, then mixed with fuel and ignited in the combustor 36 to produce high speed exhaust gases.

Figure 2:
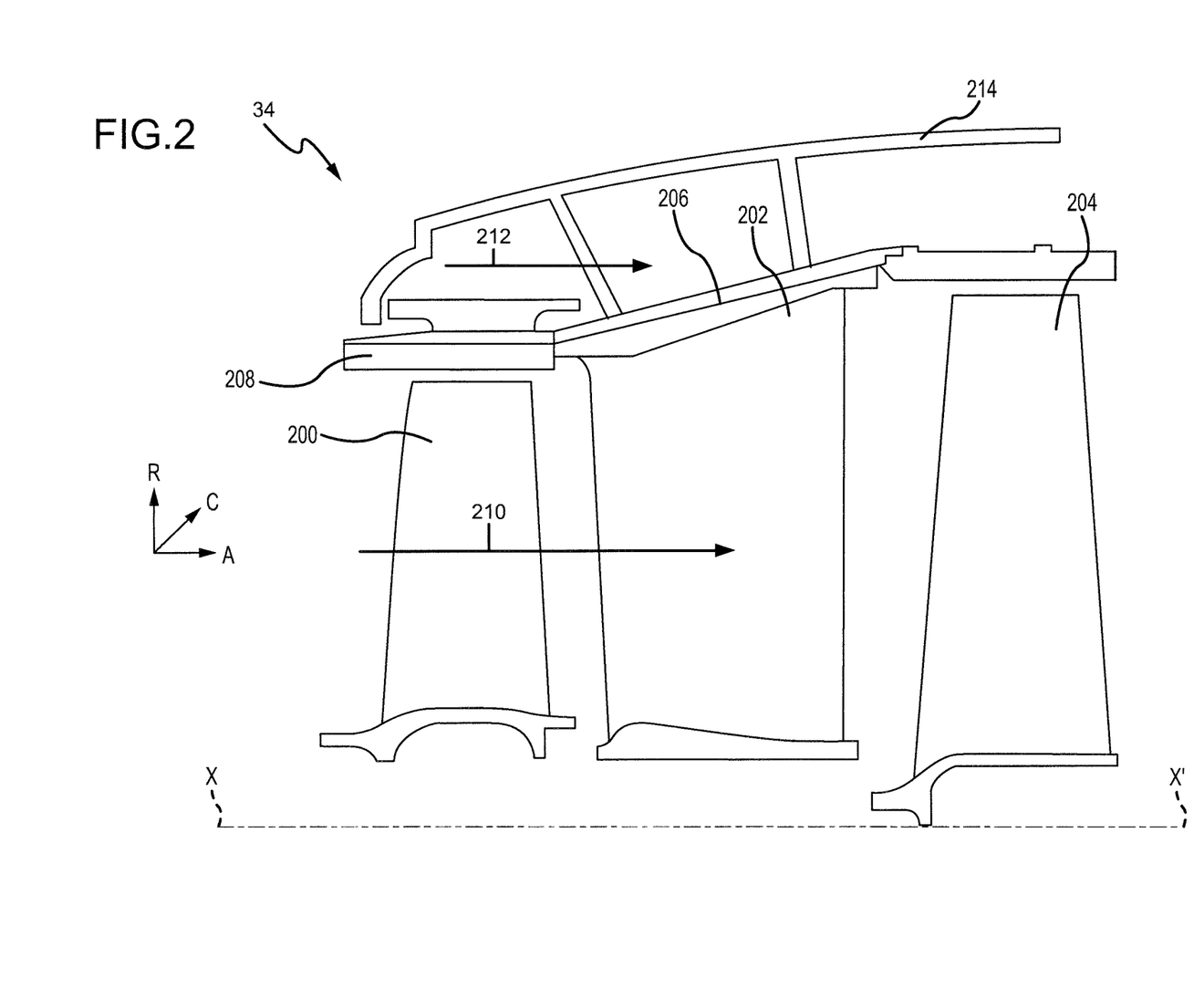
FIG. 2 is an enlarged schematic cross-section of a high pressure turbine section of the gas turbine engine of FIG. 1, in accordance with various embodiments.

With reference now to FIGS. 1 and 2, a portion of high pressure turbine section 34 includes a first rotor blade 200, a vane 202, and a second rotor blade 204. First rotor blade 200 and second rotor blade 204 are each configured to rotate about axis X-X' relative to vane 202 in response to receiving a flow of fluid from combustor section 8. This flow of fluid may be referred to as a gas path and is designated by an arrow 210.

Torque is generated by rotation of first rotor blade 200 and second rotor blade 204 in response to first rotor blade 200 and second rotor blade 204 receiving the flow of fluid. Vane 202 is coupled to a frame 214 of high pressure turbine section 34 and conditions the flow of fluid between first rotor blade 200 and second rotor blade 204. Vane 202 is thus a stator and does not rotate relative to axis X-X'. Each of first rotor blade 200, vane 202, and second rotor blade 204 may be considered a stage of high pressure turbine section 34.

High pressure turbine section 34 also includes a blade outer air seal (BOAS) 208. BOAS 208 is positioned radially outward from first rotor blade 200 and reduces an amount of fluid that may flow at a location radially outward from first rotor blade 200, thus reducing fluid leakage and, in turn, increasing performance of gas turbine engine 2. High pressure turbine section 34 also includes an outer diameter platform 206. Outer diameter platform 206 may be coupled to frame 214 and vane 202 and resist movement of vane 202 relative to frame 214.

Pressurized air, designated by an arrow 212, is commonly diverted from combustor section 8 and/or compressor section 24 and is used to cool components within high pressure turbine section 34. Fluid in the gas path may have a greater temperature than the pressurized air designated by arrow 212. Thus, the pressurized air designated by arrow 212 may be referred to as a cooling flow.

It may be desirable to reduce an amount of fluid that leaks from the gas path between each stage of high pressure turbine section 34 as fluid leakage may reduce performance. Furthermore, it may be undesirable for the hot fluid from the gas path to contact frame 214 or to mix with cooling flow 212. Thus, well-sealed gaps between axially-adjacent components, such as between BOAS 208 and outer diameter platform 206, increase performance aspects of gas turbine engine 2, such as efficiency, and may increase the lifespan of gas turbine engine 2.

Figure 3:
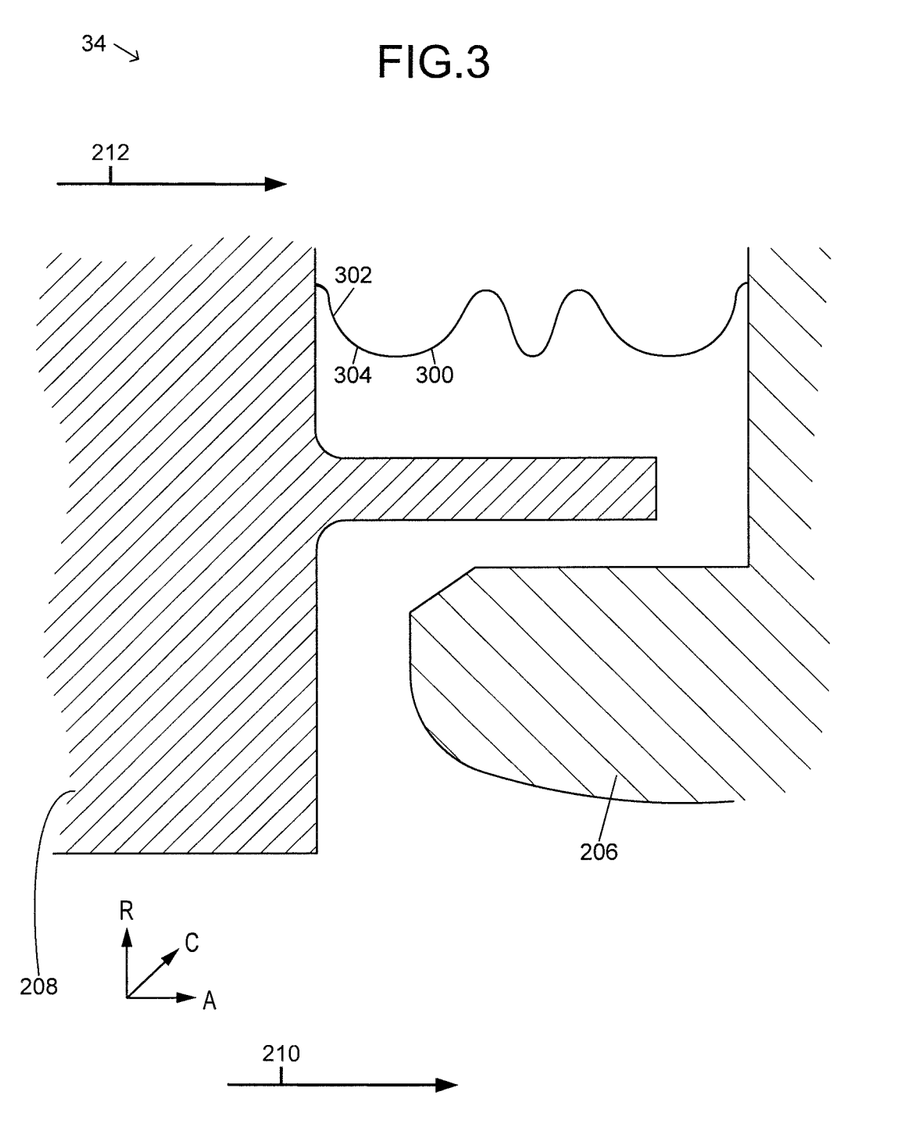
FIG. 3 is an enlarged view of the turbine section shown in FIG. 2 illustrating a blade outer air seal, an outer diameter platform and a metal gasket bellows seal, in accordance with various embodiments.

Referring to FIGS. 2 and 3, high pressure turbine section 34 may include a metal gasket bellows seal, or "W seal," 300 extending axially between BOAS 208 and outer diameter platform 206. Metal gasket bellows seal 300 may extend circumferentially about high pressure turbine section 34 and may thus be an annular structure. Metal gasket bellows seal 300 has a first side 302 and a second side 304. First side 302 faces radially outward relative to vane 202 and second side 304 faces radially inward relative to vane 202. First side 302 may be exposed to the cooling flow, designated by arrow 212, and second side 304 may be exposed to the gas path flow, designated by arrow 210. Thus, second side 304 may be exposed to greater temperatures and pressures than first side 302.

Figure 4:
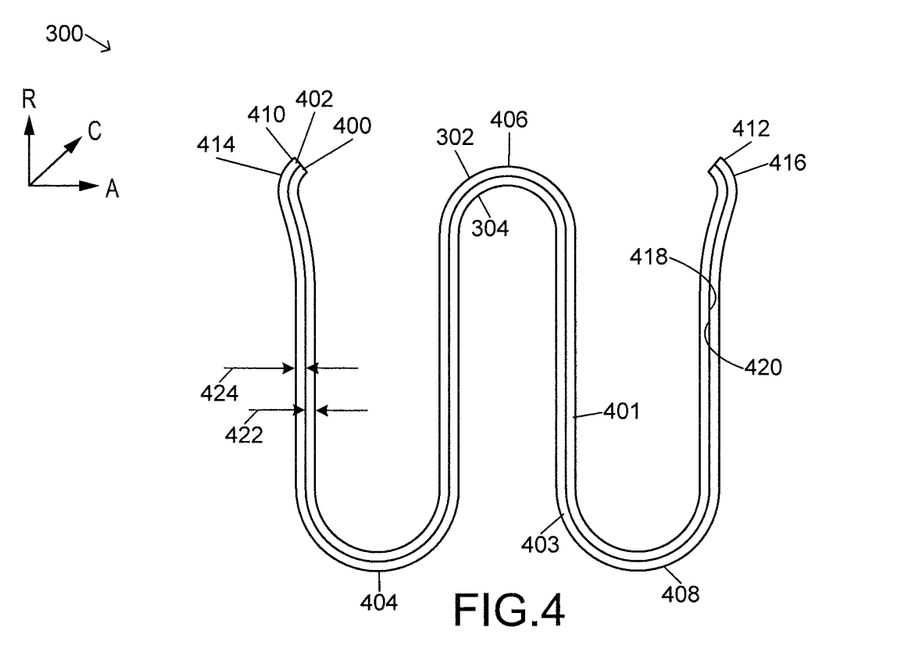
FIG. 4 is a drawing of the metal gasket bellows seal illustrated in FIG. 3, in accordance with various embodiments.

Turning now to FIG. 4, metal gasket bellows seal 300 may include a first ply 400 located at first side 302 and a second ply 402 located at second side 304 relative to the first ply 400. First ply 400 may include a first material 401 and second ply 402 may include a second material 403.

Because second ply 402 is in closer proximity to the gas path fluid than first ply 400, it is desirable for second material 403 to have a greater maximum operating temperature, or to be capable of withstanding greater temperatures without losing significant yield strength, than first material 401. Stated differently, a first yield strength of first material 401 may become reduced at a first temperature and a second yield strength of second material 403 may become reduced at a second temperature that is greater than the first temperature.

The gas path fluid may have temperatures that reach about 1,750 degrees Fahrenheit (1,750° F., 954° Celsius (C)) (where used in this context, "about" refers to the value plus or minus 5 percent (5%) of the value) and may exceed 2,200° F. (1,204° C.). The cooling flow, on the other hand, may have temperatures that reach about 1,450° F. (788° C.). In various embodiments, first material 401 may have a maximum operating temperature up to 1,500° F. (816° C.), such as temperatures ranging between 1,200° F. and 1,500° F. (between 649° C. and 816° C.). In various embodiments, second material 403 may have a maximum operating temperature up to 2,000° F. (1,093° C.), such as temperatures ranging between 1,700° F. and 2,000° F. (926° C. and 1,093° C.).

Many materials that have a greater relative maximum operating temperature, or higher relative temperature capability, may have a lesser relative yield strength. Referring briefly to FIGS. 3 and 4, it is desirable for metal gasket bellows seal 300 to have a relatively high yield strength because BOAS 208 may move relative to outer diameter platform 206 in the axial direction and, thus, may compress metal gasket bellows seal 300. In order to provide this relatively high yield strength of metal gasket bellows seal 300, first material 401 may have a greater yield strength than second material 403.

Returning to FIG. 4 and in various embodiments, first material 401 may have a yield strength that is between 1½ and 2½ times stronger than second material 403. In various embodiments, first material 401 may have a yield strength that is between 40 kilopounds per square inch (KSI, 275 megapascals (MPa)) and 90 KSI (620 MPa) at a temperature of about 1450 degrees Fahrenheit (787.8 degrees Celsius). In various embodiments, second material 403 may have a yield strength that is between 20 KSI (137 MPa) and 50 KSI (344 MPa).

Turning now to FIGS. 3 and 4 and in various embodiments, second ply 402 may contact one or both of BOAS 208 and outer diameter platform 206 and first ply 400 may not contact one or both of BOAS 208 and outer diameter platform 206. Thus, it may be desirable for second material 403 to have a greater wear resistance than first material 401 as second material 403 may have a greater contact surface area than first material 401.

Returning reference to FIG. 4 and in various embodiments, first material 401 may include a nickel based alloy and second material 403 may include a cobalt based alloy. Where used in this context, a nickel-based alloy includes more nickel by weight percent (wt %) than any other single element and, where used in this context, a cobalt-based alloy includes more cobalt by wt % than any other single element. For example, a compound having 40% nickel, 30% cobalt and 30% aluminum may be referred to as a nickel-based alloy.

In various embodiments, first material 401 may include a high performance nickel-based super alloy (e.g., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y., USA). In various embodiments, second material 403 may include a cobalt-nickel-chromium-tungsten alloy (e.g., an alloy that comprises, by wt %, 39% cobalt, 22% nickel, 22% chromium and 14% tungsten that is available under the trademark HAYNES™ 188, also available from Haynes International, Inc. of Kokomo, Ind., USA).

A cobalt based alloy may provide greater wear resistance than a nickel-based alloy. As cobalt is exposed to air at certain temperatures, it forms an oxide layer. The oxide layer formed on a cobalt alloy is lubricious. This lubricious layer provides higher wear resistance relative to a nickel-based alloy. In various embodiments, second material 403 may include a non-cobalt based material having a cobalt based alloy coating.

In various embodiments, first material 401 of first ply 400 provides additional resilience, or "spring back" capability, to metal gasket bellows seal 300 than would be provided if first material 401 included a material having a lower yield strength. Furthermore, although second material 403 of second ply 402 may include a lower-strength material, it has greater elongation and ductility properties than first material 401. This allows second ply 402 to withstand large strains, or high deflections, without experiencing fatigue or fracturing.

Referring to FIGS. 1 and 4 and in various embodiments, metal gasket bellows seal 300 may be used in portions of gas turbine engine 2 other than high pressure turbine section 34. For example, metal gasket bellows seal 300 may be used in low pressure turbine section 26, compressor section 6, combustor section 8 or the like. The materials and material properties of first material 401 and second material 403 may vary based on the location of use of metal gasket bellows seal 300. For example, if metal gasket bellows seal 300 is used in low pressure turbine section 26, a maximum operating temperature of first material 401 and/or second material 403 may be less than if metal gasket bellows seal 300 is used in high pressure turbine section 34 because temperatures and pressures experienced in low pressure turbine section 26 are less than temperatures and pressures experienced in high pressure turbine section 34.

In various embodiments and referring to FIG. 4, first ply 400 may have a first thickness 422 and second ply 402 may have a second thickness 424. Each of first thickness 422 and second thickness 424 may be between 1 thousandth of an inch (also referred to as 1 mil, 0.0254 millimeters (mm)) and 10 mils (0.254 mm), between three mils (0.076 mm) and ten mils (0.254 mm), between three mils (0.076 mm) and six mils (0.15 mm), between four mils (0.1 mm) and six mils (0.15 mm), or about five mils (0.13 mm).

First ply 400 may be positioned adjacent to second ply 402. Stated differently, first ply 400 may be generally in contact with second ply 402 or a small gap may be present between first ply 400 and second ply 402. In various embodiments, first ply 400 may be nested within second ply 400. Where used in this context, adjacent means that at least a portion of first ply 400 is in contact with second ply 402 or is within 1 mil (0.0254 mm), within 2 mils (0.0508 mm), within 5 mils (0.127 mm) or within 10 mils (0.254 mm) of second ply 402. First ply 400 has a first inner surface 418 and second ply 402 has a second inner surface 420. In various embodiments, at least a portion of first inner surface 418 may be in contact with at least a portion of second inner surface 420.

Metal gasket bellows seal 300 includes a first end 410 and a second end 412. Metal gasket bellows seal 300 further includes a first bend 404, a second bend 406 and a third bend 408. Metal gasket bellows seal 300 may have a serpentine shape due to first bend 404, second bend 406 and third bend 408. In particular, metal gasket bellows seal 300 has a shape that resembles a "W."

In various embodiments, first ply 400 and second ply 402 may be formed together. First ply 400 and second ply 402 may each have a first circumferential dimple 414 proximate to first end 410 and a second circumferential dimple 416 proximate to second end. First circumferential dimple 414 and second circumferential dimple 416 may extend around a portion of or the entire circumference of metal gasket bellows seal 300 and may resist separation of second ply 402 relative to first ply 400.

Figure 5:
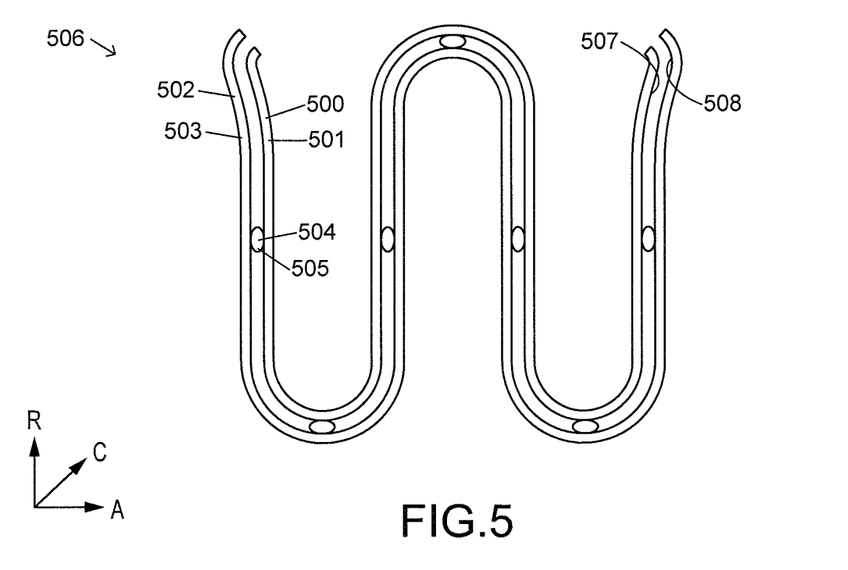
FIG. 5 is a drawing of another metal gasket bellows seal for use in a gas turbine engine, in accordance with various embodiments.

Turning now to FIG. 5, another metal gasket bellows seal 506 is shown. Metal gasket bellows seal 506 includes a first ply 500 having a first material 501 and a second ply 502 having a second material 503. With brief reference to FIGS. 4 and 5, first ply 500 and second ply 502 may have similar features as first ply 400 and second ply 402.

Returning reference to FIG. 5, metal gasket bellows seal 506 may also include at least one spacer 504. Spacer 504 may be positioned between first ply 500 and second ply 502. For example, spacer 504 may be positioned between a first inner surface 507 of first ply 500 and between a second inner surface 508 of second ply 502. Spacer 504 may be in contact with first inner surface 507 and second inner surface 508. In that regard, spacer 504 reduces thermal conduction between first ply 500 and second ply 502, thus largely protecting first ply 500, which has a lower temperature capability than second ply 502, from heat transfer from second ply 502.

Spacer 504 may include a third material 505. Third material 505 may be a metal or a ceramic-based material or coating. In various embodiments, third material 505 may be the same as first material 501 or second material 503 in order to increase weldability of spacer 504 to first ply 500 and/or to second ply 502. In various embodiments, third material 505 may be a ceramic material. Ceramic-based materials provide benefits relative to metal-based materials. For example, ceramic-based materials are less conductive than metal-based materials and, thus, a ceramic spacer 504 will transfer less heat from second ply 502 to first ply 500 relative to a metal spacer 504.

Figure 6:
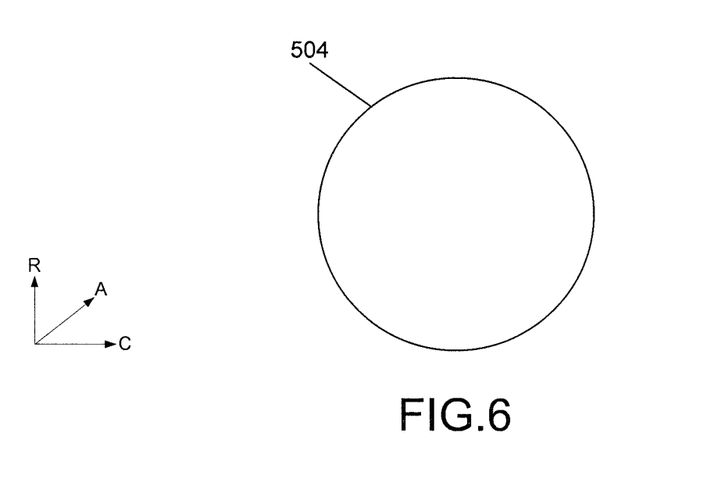
FIG. 6 is an axial view of the metal gasket bellows seal of FIG. 5, in accordance with various embodiments.

In various embodiments and with reference to FIGS. 5 and 6, spacer 504 may be an annular structure. In that regard, spacer 504 may extend about an entire circumference of metal gasket bellows seal 506.

Figure 7:
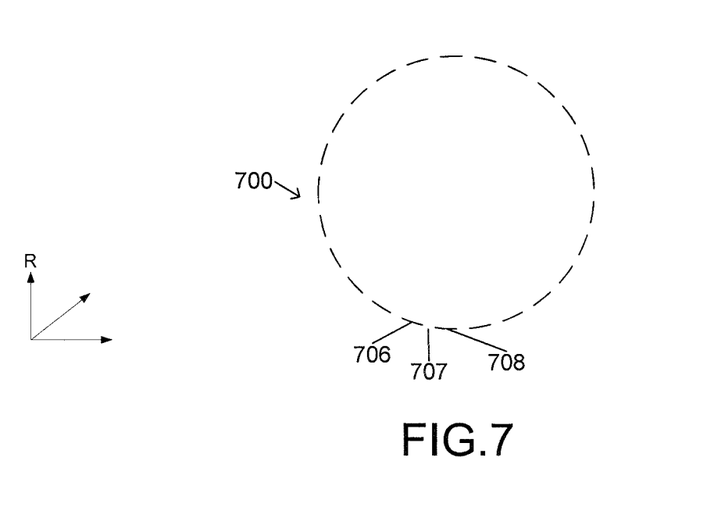
FIG. 7 is an axial view of another metal gasket bellows seal for use in a gas turbine engine, in accordance with various embodiments.

In various embodiments and with reference to FIG. 7, a plurality of spacers 700 may each be positioned about a circumference of a metal gasket bellows seal. Plurality of spacers 700 includes a first spacer 706 that extends around a portion of a circumference of a metal gasket bellows seal, a second spacer 708 that extends around another portion of the circumference of the metal gasket bellows seal and a space positioned circumferentially between first spacer 706 and second spacer 708. Plurality of spacers 700 may include any number of spacers. In various embodiments, plurality of spacers 700 may include one or more spacer that may have any length, size or orientation.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 u.s.c. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metal gasket bellows seal comprising:
   a first ply comprised of a first material having a first yield strength; and
   a second ply positioned adjacent to the first ply and comprised of a second material having a second yield strength that is different than the first yield strength, wherein:
   the metal gasket bellows seal has a first end, a second end and a serpentine shape,
   the first ply and the second ply define a first dimple proximate to the first end and a second dimple proximate to the second end, and the second material has a second yield strength that is less than the first yield strength.

2. The metal gasket bellows seal of claim 1, wherein the second material has a greater maximum operating temperature than the first material.

3. The metal gasket bellows seal of claim 2, wherein the second material has a greater wear resistance than the first material.

4. The metal gasket bellows seal of claim 1, wherein the first material includes a nickel-based alloy.

5. The metal gasket bellows seal of claim 4, wherein the first material includes an alloy having, by weight percent (wt %), 58% nickel, 19% chromium, 13% cobalt, 4% molybdenum, 3% titanium and 1.4% aluminum.

6. The metal gasket bellows seal of claim 4, wherein the second material includes a cobalt based alloy or a nickel based alloy.

7. The metal gasket bellows seal of claim 6, wherein the second material includes an alloy having, by weight percent (wt %), 39% cobalt, 22% nickel, 22% chromium and 14% tungsten.

8. The metal gasket bellows seal of claim 1, wherein the first yield strength is between 40 kilopounds per square inch (KSI) and 90 KSI at a temperature of 787.8 degrees Celsius and the second yield strength is between 20 KSI and 50 KSI at the temperature of 787.8 degrees Celsius.

9. The metal gasket bellows seal of claim 1, further comprising at least one spacer positioned between the first ply and the second ply and configured to reduce a surface area of contact between the first ply and the second ply.

10. The metal gasket bellows seal of claim 9, wherein the at least one spacer has an annular shape extending substantially along a circumference of the metal gasket bellows seal.

11. The metal gasket bellows seal of claim 9, wherein the at least one spacer includes multiple spacers each extending for a portion of a circumference of the metal gasket bellows seal.

12. The metal gasket bellows seal of claim 9, wherein the at least one spacer is comprised of a third material that includes at least one of a metal or a ceramic.

13. The metal gasket bellows seal of claim 12, wherein the third material is the same as the second material.

14. The metal gasket bellows seal of claim 1, wherein the first ply and the second ply each have a thickness between 1 thousandth of an inch (1 mil, 0.0254 millimeters (mm)) and 10 mils (0.254 mm).

15. A metal gasket bellows seal comprising:
a first ply comprised of a first material having a first yield strength, the first ply having a first inner surface;
a second ply positioned adjacent to the first ply and comprised of a second material having a second yield strength that is less than the first yield strength, the second ply having a second inner surface; and
at least one spacer positioned between the first ply and the second ply and in contact with the first inner surface and the second inner surface, the at least one spacer including a ceramic.

16. The metal gasket bellows seal of claim 15, wherein the at least one spacer includes multiple spacers each in contact with a portion of the first inner surface and the second inner surface.

17. A turbine section of a gas turbine engine comprising:
a blade outer air seal;
a vane; and
a metal gasket bellows seal positioned between the blade outer air seal and the vane and having a first ply comprised of a first material having a first yield strength and a second ply positioned adjacent to the first ply and comprised of a second material having a second yield strength that is less than the first yield strength,
wherein:
the metal gasket bellows seal has a first end, a second end and a serpentine shape,
the first ply and the second ply define a first dimple proximate to the first end and a second dimple proximate to the second end, and
the second material has a second yield strength that is less than the first yield strength.

18. The turbine section of claim 17, wherein the second material has a greater maximum operating temperature than the first material and the second material has a greater wear resistance than the first material.

* * * * *